(12) United States Patent
Shima et al.

(10) Patent No.: US 8,107,384 B2
(45) Date of Patent: Jan. 31, 2012

(54) INFORMATION COMMUNICATION SYSTEM, TRANSMITTING APPARATUS, TRANSMITTING METHOD, AND COMPUTER PROGRAM

(75) Inventors: Hisato Shima, Tokyo (JP); Takehiko Nakano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1075 days.

(21) Appl. No.: 10/548,642

(22) PCT Filed: Nov. 15, 2004

(86) PCT No.: PCT/JP2004/016933
§ 371 (c)(1),
(2), (4) Date: Jun. 20, 2006

(87) PCT Pub. No.: WO2005/069549
PCT Pub. Date: Jul. 28, 2005

(65) Prior Publication Data
US 2006/0240770 A1    Oct. 26, 2006

(30) Foreign Application Priority Data
Jan. 15, 2004    (JP) ................. 2004-008517

(51) Int. Cl.
*H04L 1/00* (2006.01)
(52) U.S. Cl. ...................................... 370/252
(58) Field of Classification Search .................. None
See application file for complete search history.

(56) References Cited

U.S. PATENT DOCUMENTS

| | | | |
|---|---|---|---|
| 7,058,414 B1 | 6/2006 | Rofheart et al. | |
| 2003/0220110 A1* | 11/2003 | Kizu et al. | 455/445 |
| 2003/0220765 A1 | 11/2003 | Overy et al. | |
| 2003/0236938 A1 | 12/2003 | Bennett | |
| 2004/0009776 A1* | 1/2004 | Ishikawa et al. | 455/453 |
| 2004/0030837 A1* | 2/2004 | Geiner et al. | 711/133 |
| 2005/0111432 A1* | 5/2005 | Ekstrom et al. | 370/350 |
| 2005/0163103 A1* | 7/2005 | Malomsoky et al. | 370/352 |
| 2005/0265503 A1 | 12/2005 | Rofheart et al. | |
| 2005/0273608 A1 | 12/2005 | Kamperman | |
| 2005/0276223 A1* | 12/2005 | Maggi et al. | 370/235 |
| 2005/0278451 A1* | 12/2005 | Yamashita | 709/229 |
| 2006/0240770 A1* | 10/2006 | Shima et al. | 455/39 |

FOREIGN PATENT DOCUMENTS

JP    06-271154    9/1994
(Continued)

OTHER PUBLICATIONS

Digital Transmission Content Protection Specification; vol. 1 (Informational Version); Revision 1.3; Jan. 7, 2004; pp. 1-76; http://www.dtcp.com/data/info_20031124$_{13}$ dtcp_Vol1_1p3.pdf.

*Primary Examiner* — Jianye Wu
(74) *Attorney, Agent, or Firm* — Finnegan, Henderson, Farabow, Garrett & Dunner, L.L.P.

(57) ABSTRACT

Transmission of contents from a transmitting apparatus to a plurality of receiving apparatuses is performed, while putting restrictions on a communication area and the number of receiving apparatuses in conformity with a definition of DTCP.
In a case of a need to distribute literary works such as movies and the music within a single home network, while preventing the transmission of the literary works to other home networks, a degree of freedom in communication is raised in a case where a communication delay time is short so that a high possibility exists that the communication delay time falls within a specific range. Conversely, in a case where the communication delay time is long so that a low possibility exists that the communication delay time falls within the specific range, the degree of freedom in communication is lowered. Thus, it is allowable to implement a system that ensures a high barrier to unauthorized content distributions, and also, does not have any remarkable restrictions on a rightful home use.

19 Claims, 9 Drawing Sheets

FOREIGN PATENT DOCUMENTS

| | | |
|---|---|---|
| JP | 10-271154 | 10/1998 |
| JP | 11-55286 | 2/1999 |
| JP | 2000-307603 | 11/2000 |
| JP | 2002-073861 | 3/2002 |
| JP | 2003-143212 | 5/2003 |
| JP | 2003-218951 | 7/2003 |
| JP | 2003-258885 | 9/2003 |
| WO | WO 01/93434 A2 | 12/2001 |
| WO | WO 2004/014037 | 2/2004 |

* cited by examiner

US 8,107,384 B2

INFORMATION COMMUNICATION SYSTEM, TRANSMITTING APPARATUS, TRANSMITTING METHOD, AND COMPUTER PROGRAM

CROSS REFERENCE TO RELATED APPLICATIONS

This application is a national phase application based on PCT/JP2004/016933, filed Nov. 15, 2004, the content of which is incorporated herein by reference, and claims the right to priority based on Japanese Application No. 2004-008517, filed Jan. 5, 2004, the content of which is incorporated herein by reference.

TECHNICAL FIELD

The present invention relates to an information communication system, a transmitting apparatus, a transmitting method and a computer program allowing a transmitting apparatus to transmit information to a plurality of receiving apparatuses, and particularly, to an information communication system, a transmitting apparatus, a transmitting method and a computer program allowing a home server adapted to store content such as video content and audio content to distribute the content to a receiving apparatus such as a TV and a player on a home network.

More specifically, the present invention relates to an information communication system, a transmitting apparatus, a transmitting method and a computer program for transmitting content from a transmitting apparatus to a plurality of receiving apparatuses while restricting a utilization of the content within a range of private-use, and particularly, to an information communication system, a transmitting apparatus, a transmitting method and a computer program for transmitting content from a transmitting apparatus to a plurality of receiving apparatuses while limiting a communication area and the number of receiving apparatuses in conformity with of a definition of DTCP (Digital Transmission Content Protection).

BACKGROUND ART

It is well known that interconnection of a plurality of computers on a network realizes information resource sharing, hardware resource sharing and an inter-user collaboration. Inter-computer connection media are available in various types such as LAN (Local Area Network), WAN (Wide Area Network) and Internet etc.

In particular, computer and network technologies etc. are recently being widespread among general homes. Home information apparatuses such as personal computers and PDAs (Personal Digital Assistants), and besides, various types of informative home information appliances such as televisions and video players are interconnected via a home network.

In most cases, the home network is interconnected via a router to an external wide area network, typically the Internet. For instance, after content having been rightfully acquired from a server on the Internet is stored in a server (which is hereinafter also referred to as "a home server") on the home network, the content is distributed to other home terminals (clients) via the home network, thereby enabling the same content to be enjoyed within the home.

Nowadays, UPnP™ is known as a protocol constituting the home network, for instance. According to the UPnP™, a network may be easily established without involving any complicated operation, thereby enabling a content distribution service to be provided between networked apparatuses without involving any troublesome operation or setting. Further, the UPnP™ has an advantage of being non-dependent on an operating system (OS) so that more apparatuses may be easily networked.

In the UPnP™, a mutual authentication takes place between the networked apparatuses through an exchange of a definition file described in the form of XML (eXtensible Markup Language). An outline of UPnP™ processing is as follows.

(1) Addressing: Processing to acquire one's own device ID such as an IP address.

(2) Discovery: Processing to effect a retrieval of each device on the network for acquiring information regarding device types and functions etc. contained in a response having been received from each device.

(3) Service request: Processing to give a service request to each device on the basis of the information having been acquired by the discovery processing.

A practice to follow a procedure of the above processing may result in distribution and reception of the service to which the networked apparatuses are applied. A newly networked apparatus acquires the device ID through the addressing processing to acquire information of another networked device through the discovery processing, so that the service request may be available.

Other apparatuses on the home network may have access to the content stored in the home server. Then, the apparatuses having established a UPnP™ connection may acquire the content from the home server. In a case where the content is video data or audio data, a connection to the TV or the player etc. as the apparatus connected to the network may result in watching of movies or listening to the music.

On the other hand, content handled via the network is in the form of digital data, in which case, a problem arises that unauthorized operations such as copying and falsifying are put into practice relatively with ease. At present days, fraudulent acts such as copying and falsifying of the contents frequently take place, which contribute to a primary factor of an obstruction to profits of digital content venders. This also brings about a need for a raise in content price, resulting in an occurrence of a vicious cycle supposed to constitute a barrier to a more widespread use.

Under the Copyright Law, the digital contents are protected as one of literary works against unfair uses such as unauthorized duplication and falsifying. It is stipulated in Section 30 of the Copyright Law, for instance, that as far as a purpose of private or home use etc., a user oneself might be authorized to duplicate the literary works without restrictions on a type of literary works or a mode of duplication. Further, Sub-Section 1 of Section 49 of the Copyright Law provides to the effect that a transfer of a duplication right of a copyright owner arises in the case where a duplicated matter having been created for the private use was applied for a purpose other than the private use, that is, prohibits what is called a use in excess of the purpose of private use.

In a case of introducing a concept of the private use into the home network, the client terminals connected to the home network are supposed to fall within the range of private or home use. Thus, the client terminals on the home network are deemed to be adaptable to freely use the rightfully acquired contents in the home server. As a matter of course, it is necessary to put certain restrictions on the number of terminals that enable the content to be given. The DTCP (Digital Transmission Control Protection) specified as an industry standard that defines a digital transmission content protection imposes restrictions on a communication area in which contents are transmitted and the number of apparatuses allowed to receive the contents (Refer to a non-patent document 1, for instance).

However, any technologies under the present conditions have difficulty in determining that the client terminal having finished a login to the home network falls within the range of private use or not.

For instance, since the home network is interconnected to the external network through the router on a protocol basis, an actual current position of the client having gained access is unknown to the home server. If the home server distributes the content in response to an external (remote) access, the content is subject to an approximately unrestricted utilization, in which case, a copyright on the content is supposed to have almost no protection. As a result, there is a fear that a content creator will lose one's inspiration for creation.

On the other hand, if strict restrictions are imposed on the client terminals, the user fails to secure the private use supposed to be authorized essentially under the provisions of the Copyright Law. As a result, the user cannot fully enjoy the content, which leads to a failure in progress of the utilization of the home server and a content distribution service, so that there is a fear that a hindrance to a content business development itself will arise.

In view of circumstances that the user who is a rightful purchaser of the literary works is authorized to utilize the literary works at will, there is provided a proposal on a method ensuring that an acceptance of a content right holder is easily obtained in a case where the user makes the duplication of information on the network into the utilization (Refer to a Patent document 1, for instance). However, this method is to classify the users depending on a level of relation with an information utilization-right holder, before distributing the information according to distribution ways being different for each relation level, but not to determine to what extent on the network is applicable to the range of private use.

Further, as one method of rejecting unauthorized access of the external network to the home network, a method of allowing the home server to hold a list of access authorized clients may be taken to reject the unauthorized access by performing a collation with the list every time an access request from the client to the home server is caused.

For instance, there is known a MAC (Media Access Control) address filtering that provides a list given as an access authorized apparatus list using a MAC address specified as a physical address that is unique to each communication apparatus. That is, following a preliminary registration of the MAC address of each access authorized apparatus in a router or a gateway serving to isolate an internal network like the home network from the external network, the MAC address assigned to a received packet is collated with the registered MAC address, whereby any access by the apparatus having an unregistered MAC address is rejected (Refer to a patent document 2, for instance).

However, it is necessary to check the MAC addresses of all the apparatuses connected to the internal network in order to build an access authorized apparatus list, and besides, much labor is taken to create the list by an entry of all the acquired MAC addresses. Further, in the home network, the connected apparatuses are subject to relatively frequent changes, resulting in a need to update the access authorized apparatus list for each of the above changes.

In a case where the home network is indirectly connected to the external network through the router or the gateway, it is allowable to determine, on the basis of the MAC address etc., that the client is connected to which of the home network or the external network. Conversely, in a case where the home network is directly connected to the external network by a modem etc., it is difficult or impossible to identify that the client is connected to which of the home network or the external network.

[Patent Document 1]
Published Japanese Patent Application (KOKAI) No. 2002-73861
[Patent Document 2]
Published Japanese Patent Application (KOKAI) No. Hei 10-271154
[Non-Patent Document 1]
http://www.dtcp.com/data/info 20031124 dtcp Vol 1 1p3.pdf

DISCLOSURE OF INVENTION

The present invention is intended to provide an information communication system, a transmitting apparatus, a transmitting method and a computer program that are superior in that a home server adapted to store content such as video content and audio content may preferably distribute the content to a receiving apparatus such as a TV and a player on a home network.

The present invention is further intended to provide an information communication system, a transmitting apparatus, a transmitting method and a computer program that are superior in that transmission of content may be effected from a transmitting apparatus to a plurality of receiving apparatuses while restricting a utilization of the content within a range of private use, that is, bringing a communication area within the home network.

The present invention is furthermore intended to provide an information communication system, a transmitting apparatus, a transmitting method and a computer program that are superior in that the transmission of content may be effected from a transmitting apparatus to a plurality of receiving apparatuses while putting restrictions on a communication area and the number of receiving apparatuses in conformity with a definition of DTCP.

The present invention has been undertaken in view of the above problems, and a first aspect of the present invention is an information communication system in which a transmitting apparatus transmits information to a plurality of receiving apparatus, characterized by having communication delay time acquiring means for acquiring a communication delay time for each receiving apparatus from the transmitting apparatus, and connection control means for authorizing a connection to receiving apparatuses up to a predetermined number within a predetermined communication delay time.

It is to be understood that "the system" set forth herein is specified as a logical aggregate of a plurality of units (or functional module that implements a specific function), and it does not matter in particular whether or not each unit or functional module is within a single casing.

The present invention suggests introducing a concept of a communication distance in order to specify or estimate the communication area of each receiving apparatus. The communication distance is measured in the form of the communication delay time taken for a turnaround from issuance of a command from the transmitting apparatus (the home server) to the receiving apparatus till reception of a response to the command from a receiving apparatus side. The receiving apparatus involving the communication delay time being equal to or less than a predetermined value is estimated to have a short communication distance, that is, to be installed within the home network. Conversely, the receiving apparatus involving the communication delay time exceeding the predetermined value is estimated to have a long communication distance, that is, to be installed outside the home network.

The connection control means for authorizing the connection to the receiving apparatuses up to the predetermined number within the predetermined communication delay time is of being easy and effective to identify the home network.

Hereupon, the number of connection authorized receiving apparatuses may be also subject to a control depending on an upper limit value of the communication delay time.

For instance, more than one threshold of the communication delay time may be set so as to individually determine the number of connection authorized receiving apparatuses depending on a magnitude of a given threshold.

Specifically, the threshold of the communication delay time, in a case of given as a short set value, provides a high possibility that the receiving apparatus involving the communication delay time being equal to or less than this threshold falls in a specific range, that is, in the range of the home network, so that a higher degree of freedom in communication may be authorized, thereby permitting an increase in the number (the upper limit) of connection authorized receiving apparatuses.

Conversely, the threshold of the communication delay time, in a case of given as a long set value, reduces a possibility that the receiving apparatus involving the communication delay time being equal to or less than this threshold falls within the specific range, that is, in the range of the home network, so that a need to lower the degree of freedom in communication arises, in which case, a processing to decrease the number (upper limit) of connection authorized receiving apparatuses is regarded as appropriate.

Further, as a different method of controlling the number of connection authorized receiving apparatuses depending on the upper limit value of the communication delay time, a plurality of communication delay time zones may be also provided, instead of the setting of a plurality of thresholds of the communication delay time, to set the number of connection authorized receiving apparatuses for each communication delay time zone.

Further, a second aspect of the present invention relates to a computer program described in a computer readable form to perform, on a computer system, a processing for transmitting information to a plurality of receiving apparatuses while controlling a communication area, characterized by having a communication delay time acquiring step of acquiring a communication delay time for each receiving apparatus, and a connection control step of authorizing, up to a predetermined upper limit number, a connection to the receiving apparatuses involving the communication delay time being within a predetermined upper limit communication delay time.

The computer program relating to the second aspect of the present invention is defined as a program obtained by defining the computer program described in the computer readable form to implement a predetermined processing on the computer system. In other words, an installation of the computer program relating to the second aspect of the present invention into the computer system may have cooperative functions on the computer system, thereby providing the same operation effects as those of the information communication system relating to the first aspect of the present invention.

According to the present invention, there may be provided the information communication system, the transmitting apparatus, the transmitting method and the computer program that are superior in that the home server adapted to store content such as video content and audio content may preferably distribute the contents to the receiving apparatus such as a TV and a player on the home network.

Further, according to the present invention, there may be also provided the information communication system, the transmitting apparatus, the transmitting method and the computer program that are superior in that the transmission of the content may be effected from the transmitting apparatus to a plurality of receiving apparatuses while restricting the utilization of the content within the range of private use, that is, bringing the communication area within the home network.

Furthermore, according to the present invention, there may be also provided the information communication system, the transmitting apparatus, the transmitting method and the computer program that are superior in that the transmission of the content may be effected from the transmitting apparatus to a plurality of receiving apparatuses while putting the restrictions on the communication area and the number of receiving apparatuses in conformity with the convention of DTCP.

According to the present invention, in a case where there is a need to effect the communication restricted to the specific range in such a manner as to distribute the literary works such as the movies and the music only within the single home network, while preventing the transmission of the literary works to the other home networks, for instance, the degree of freedom in communication may be raised in a case where the communication delay time is short so that the high possibility exists that the communication delay time falls in the specific range. On the contrary, in a case where the communication delay time is long so that the low possibility exists that the communication delay time falls in the specific range, it becomes possible to lower the degree of freedom in communication. Thus, it is allowable to implement the system that ensures a high barrier to unauthorized content distributions, and besides, does not have any remarkable restrictions on the rightful home use.

Other objects, features and advantages of the present invention will become apparent from the following more detailed description of embodiments of the invention with reference to the accompanying drawings.

BEST MODES FOR CARRYING OUT THE INVENTION

Embodiments of the present invention are now described in detail with reference to the accompanying drawings.

Under the Copyright Law, content specified as literary works are protected against fraudulent uses such as unauthorized duplication and falsifying. By the way, a rightful user of the literary works is authorized to duplicate the content as far as the purpose of private use, that is, a personal or home use or others within its equivalently limited range (Refer to Section 30 of the Copyright Law).

The present specification is set forth on the assumption that a client terminal within a home network (which is hereinafter also referred to as "a local environment") falls within the range of private use. Then, the present inventors suggest a system that permits the utilization of contents stored in a home server, while restricting client terminals to clients in the local environment, and further, putting restrictions on the number of clients according to the convention of DTCP.

A definition of the local environment is now described.

Figure 1:
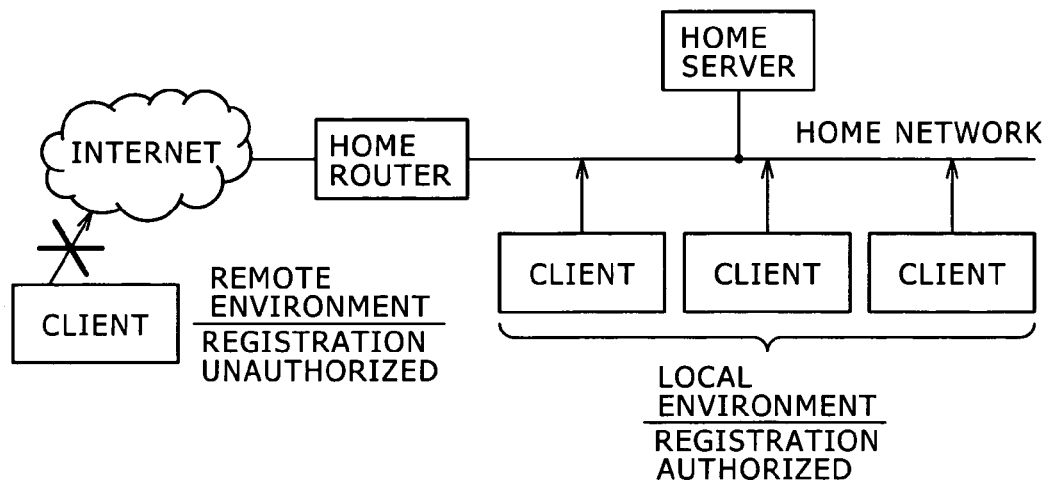
FIG. 1 is a view diagrammatically showing a basic configuration of a home network.

FIG. 1 diagrammatically shows a basic configuration of the home network. As shown in FIG. 1, the home network constructed within a home is connected to an external network such as the Internet via a home router.

On the home network, there are a home server and more than one client terminal. The home server acquires contents rightfully from a content server on the external network via the home router, and then stores the contents for distributing the contents within the home. The home server may of course acquire the contents by means of package media and broadcast reception other than the network. Each client terminal gives a request for desired content to the home server to acquire the desired content into the utilization.

The client terminals connected to the home network exist in the local environment, and are supposed to fall within a range of private or home use. Thus, the client terminals on the home network are deemed to be adaptable to freely use the rightfully acquired content in the home server.

Then, the home server registers these client terminals in the local environment as members, and distributes the content. As a matter of course, it is necessary to put certain restrictions on the number of terminals allowed to receive the content.

In the local environment, the client terminals acquire the content from the home server to utilize the content for copying or streaming, and further, may bring the content outside (a remote environment) of the local environment to utilize the content there.

On the contrary, the client terminals not in the home network, that is, the client terminals in the remote environment are not regarded as those being within the range of private or home use. If the client terminals in the remote environment are authorized to utilize the content, the content is subject to an approximately unrestricted utilization, in which case, the copyright on the content is supposed to have almost no protection. Thus, the home server does not register the clients in the remote environment as the members.

Incidentally, in FIG. 1, there is shown only a single home server on the home network for the sake of a simplification of the drawing. It is a matter of course that two or more home servers may be also installed on the same home network to ensure that each home server provides the content distribution service within the home network independently.

The home server brings a communication range, that is, a range applied to the distribution of the contents, within the home network. Thus, it becomes necessary to determine that each receiving apparatus specified as a content distribution destination exists within the home network or not.

As one method of identifying that the receiving apparatuses exist within the home network, a method of checking MAC addresses of all the apparatuses connected to the network is taken. However, in a case where the home network is directly connected to the external network via a modem etc., it is difficult or impossible to determine that the client is connected to which of the home network or the external network.

Thus, the present inventors suggest introducing a concept of a communication distance in order to specify or estimate the communication area of each receiving apparatus. The communication distance is measured in the form of a communication delay time taken for a turnaround from issuance of a command from a transmitting apparatus (the home server) to the receiving apparatus till reception of a response to the command from a receiving apparatus side. The receiving apparatus involving the communication delay time being equal to or less than a predetermined value is estimated to have a short communication distance, that is, to be installed within the home network. Conversely, the receiving apparatus involving the communication delay time exceeding the predetermined value is estimated to have a long communication distance, that is, to be installed outside the home network.

Figure 2:
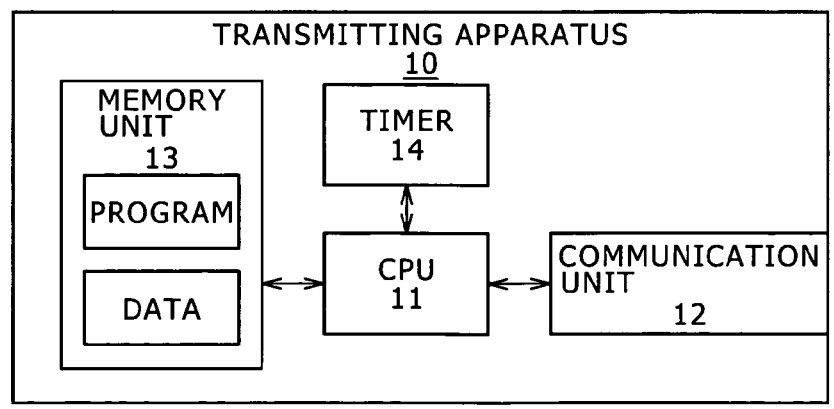
FIG. 2 is a view diagrammatically showing a functional configuration of a transmitting apparatus applied to the home network according to the present invention.

FIG. 2 diagrammatically shows a functional configuration of a transmitting apparatus 10 applied to the home network according to the present invention. The transmitting apparatus 10 is operative as a home server performing distribution of the content on the home network, for instance. As shown in FIG. 2, the transmitting apparatus 10 has a CPU (Central Processing Unit) 11, a communication unit 12, a memory unit 13, and a timer 14.

The CPU 11 generally controls an overall operation of the transmitting apparatus 10, inclusive of a communication operation such as the content distribution as a typical instance, by executing a predetermined program code.

The communication unit 12 performs a transmission processing of information through a communication path, inclusive of a modulation/demodulation and an encoding/decoding etc. of transmission information. As far as the present invention is carried out, the communication path is not particularly limited in type of a medium such as a wired or wireless medium etc.

The memory unit 13 serves to store the program code executed in the CPU 11 or to temporarily save the transmission information.

The timer 14 is used to measure the communication delay time taken for the turnaround from the issuance of the command to the receiving apparatus till the reception of the response to the command from the receiving apparatus side.

It is noted that, although not shown, the transmitting apparatus 10 has a content storing unit serving to store content such as videos and music to be transmitted to a plurality of receiving apparatuses, and other hardware components required for the transmitting apparatus to be operative as the home server.

Figure 3:
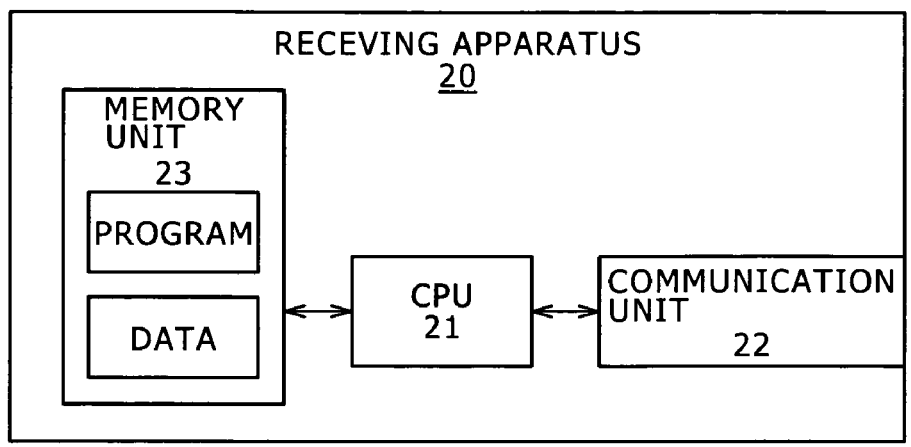
FIG. 3 is a view diagrammatically showing a functional configuration of a receiving apparatus applied to the home network according to the present invention.

FIG. 3 diagrammatically shows a functional configuration of a receiving apparatus 20 applied to the home network according to the present invention. The receiving apparatus 20 is available in the form of a TV and a player etc. adapted to receive and play back the content having been distributed from the home server on the home network. As shown in FIG. 3, the receiving apparatus 20 has a CPU 21, a communication unit 22, and a memory unit 23.

The CPU 21 generally controls the overall operation of the receiving apparatus 20, inclusive of the communication operation such as a content distribution as a typical instance, by executing the predetermined program code.

The communication unit 22 performs the transmission processing of information through the communication path, inclusive of the modulation/demodulation and the encoding/decoding etc. of the transmission information. As far as the present invention is carried out, the communication path is not particularly limited in type of the medium such as the wired or wireless medium etc.

The memory unit 23 serves to store the program code executed in the CPU 21 or to temporarily save the transmission information.

It is noted that, although not shown, the receiving apparatus 20 has a content playback unit adapted to play back the content such as the videos and the music having been received from the transmitting apparatus 10, and other hardware components required for the receiving apparatus to be operative as the TV and the player etc. adapted to receive and play back the content having been distributed from the home server.

Figure 4:
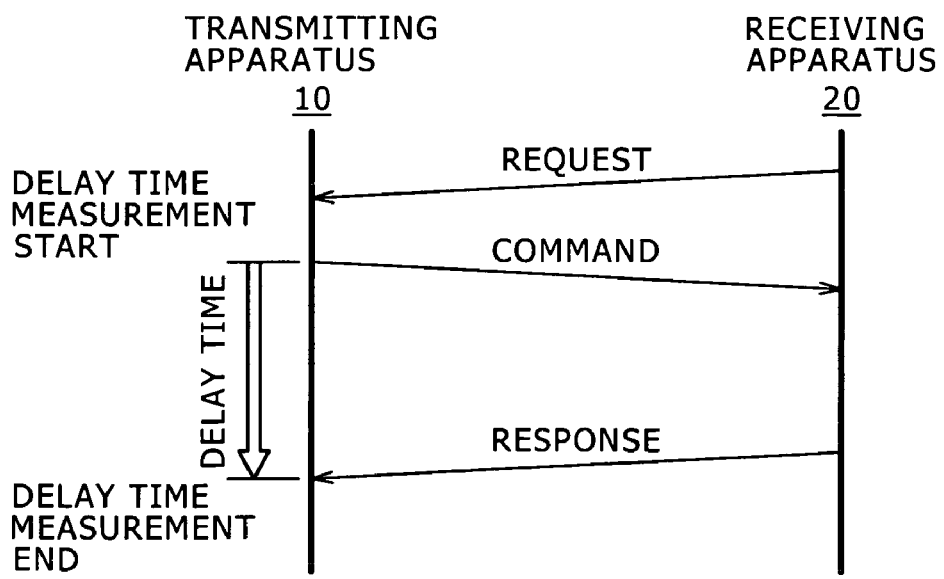
FIG. 4 is a view showing one instance of a procedure of communication between the transmitting apparatus and the receiving apparatus to be taken for estimating a communication distance.

FIG. 4 shows one instance of a procedure of communication between the transmitting apparatus 10 and the receiving apparatus 20 to be taken for estimating the communication distance.

The receiving apparatus 20, when desiring to receive content through a connection to the transmitting apparatus 10, issues a new entry request to the transmitting apparatus 10. Alternatively, the transmitting apparatus 10 discovers a new receiving apparatus 20.

In response to a trigger of receiving the new entry request or discovering of the receiving apparatus, the transmitting apparatus 10 starts the communication procedure to measure the communication distance from this receiving apparatus 20.

Specifically, the transmitting apparatus 10 issues a command to the receiving apparatus 20. When the command is received, the receiving apparatus sends back a response.

The timer 14 contained in the transmitting apparatus 10 measures the communication delay time taken for the turn-around from the issuance of the command to the receiving apparatus 20 till the reception of the response, and estimates the measured communication delay time as the communication distance. Then, the communication with the receiving apparatus 20 is subject to a control depending on the communication distance.

As described above, the transmitting apparatus 10 measures the communication distance from each receiving apparatus in the form of the communication delay time taken for the turnaround from the issuance of the command to the receiving apparatus till the reception of the response to the command from the receiving apparatus side, and then controls the communication with the receiving apparatus depending on the measured communication distance.

According to the DTCP, it is suggested as to content transmission that restrictions are put on the communication area applied to the content transmission, and also, on the number of connected receiving apparatuses within a predetermined communication area.

Figure 5:
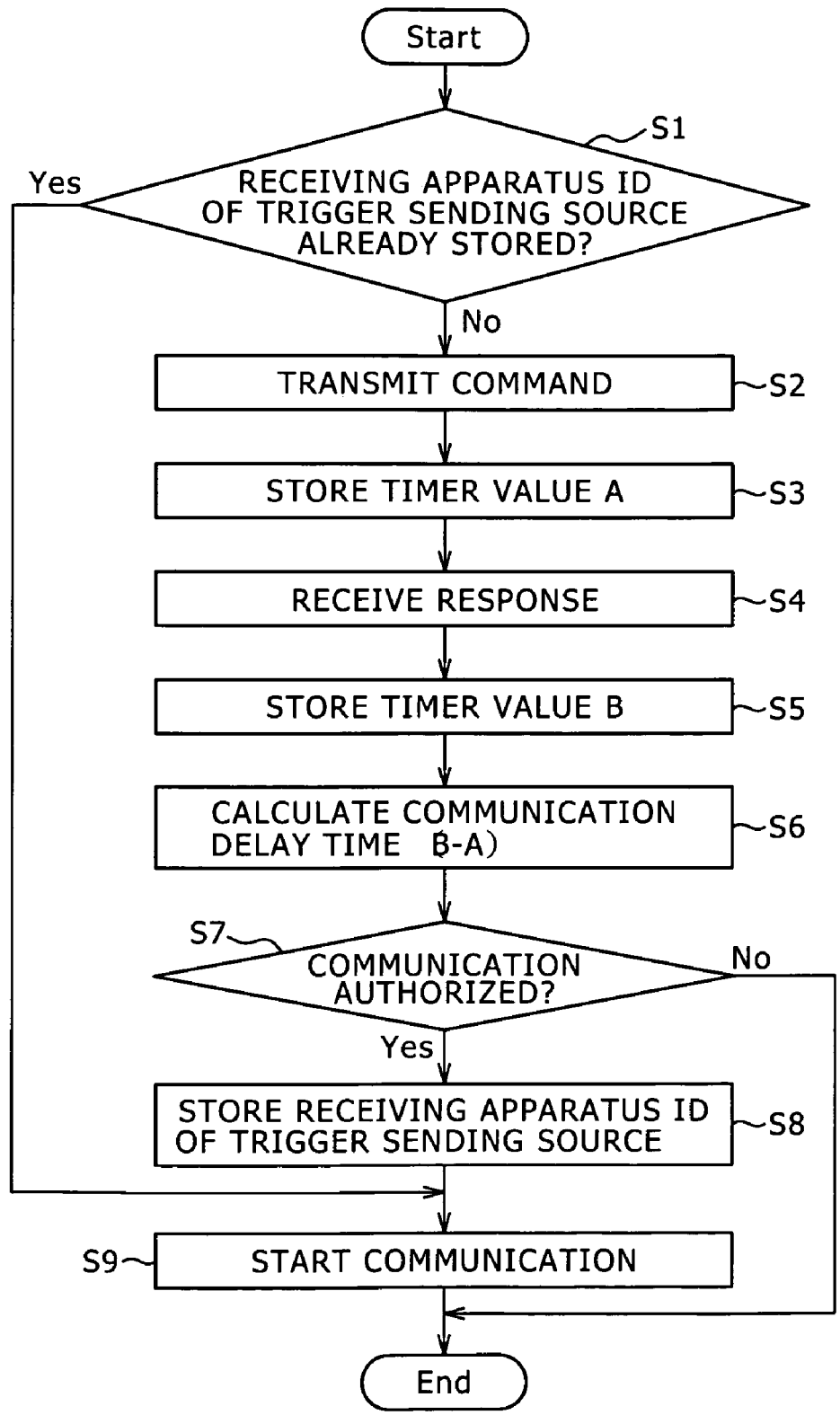
FIG. 5 is a view showing, in the form of a flowchart, the procedure of a processing for a transmitting apparatus 10 to determine a communication right depending on the communication distance from a receiving apparatus 20 and the number of connected receiving apparatuses.

FIG. 5 shows, in the form of a flowchart, the procedure of a processing for the transmitting apparatus 10 to determine a communication right depending on both the communication distance from the receiving apparatus 20 and the number of connected receiving apparatuses. It is assumed that the transmitting apparatus 10 is adapted to authorize the communication with the allowable number or below of receiving apparatuses 20 within a predetermined permissible communication area.

Under the above conditions, when the trigger of providing a request to newly connect the receiving apparatus 20 is generated, that is, an ID of the receiving apparatus 20 has not been registered by the transmitting apparatus 10 yet, a routine of the present processing is started (Step S1).

The transmitting apparatus 10 issues the command for the measurement of the communication distance (Step S2), and stores, as a variable A, a transmission time measured with the timer 14 (Step S3).

Then, when the response for the measurement of the communication distance is received from the receiving apparatus 20-side (Step S4), a reception time measured with the timer 14 is stored as a variable B (Step S5).

Calculating a difference between the variables B and A enables the communication delay time between the transmitting apparatus 10 and the receiving apparatus 20 to be obtained (Step S6).

Then, the communication right is evaluated depending on whether or not the communication delay time between the transmitting apparatus 10 and the receiving apparatus 20 is equal to or less than a threshold, and also, whether or not the number of connected apparatuses including the receiving apparatus 20 is equal to or less than an upper limit (Step S7).

In a case where a result of the above evaluation is affirmative, the transmitting apparatus 10 registers the ID of the receiving apparatus 20 (Step S8), and the transmitting apparatus 10 starts the communication with the receiving apparatus 20 (Step S9).

The concept of the above communication distance is basically given on the assumption that the communication delay time increases with the communication distance. However, the communication delay time does not always have uniqueness to a physical distance relation between the transmitting apparatus and the receiving apparatus. For instance, even if the communication distances are the same, a wireless network is supposed to provide a longer communication delay time, as compared with a wired network. On the contrary, the introduction of optical communication results in a shorter communication delay time, as compared with the wired network.

Thus, there may occur a case where reception of the content is not allowed because of a long communication delay time although the installation within the home network is actually satisfied, or conversely, a spoofing from the outside of the home network takes place for an unauthorized reception of the content by using a communication path through which the communication delay time can be reduced. The evaluation of the communication delay time, in a case of effected with only the single threshold for the control of the communication right as shown in FIG. 5, results in no judgment on a situation as described the above.

As one method of eliminating problems resulting from an occurrence of non-uniformity in the communication delay time for each communication medium as described above, a plurality of thresholds of the communication delay time is set to individually determine the number of connection authorized receiving apparatuses depending on the delay time.

Specifically, the threshold of the communication delay time, in a case of given as a short set value, provides a high possibility that the receiving apparatus involving the communication delay time being equal to or less than this threshold falls within a specific range, that is, within the home network, so that a higher degree of freedom in communication may be authorized, thereby permitting an increase in the number (the upper limit) of connection authorized receiving apparatuses.

Conversely, the threshold of the communication delay time, in a case of given as a long set value, reduces a possibility that the receiving apparatus involving the communication delay time being equal to or less than this threshold falls within the specific range, that is, within the home network, so that there arises a need to lower the degree of freedom in communication, in which case, a processing of decreasing the number (the upper limit) of connection authorized receiving apparatuses is regarded as appropriate.

Accordingly, it is allowable to implement a system that ensures a high barrier to unauthorized content distributions, and besides, does not have any remarkable restrictions on the rightful home use.

A table in the following shows one instance in which setting of the number of connection authorized receiving apparatuses depending on the delay time is performed by setting a plurality of thresholds of the communication delay time. This instance has three kinds of thresholds of 7 milliseconds, 11 milliseconds and 15 milliseconds as the threshold of the communication delay time, in which the threshold of 7 milliseconds specified as the shortest communication delay time is supposed to provide the higher degree of freedom in communication by specifying an upper limit value of the number of connection authorized receiving apparatuses as 34. In the following, as the threshold of the communication delay time is set longer in the order of 11 milliseconds and 15 milliseconds, the degree of freedom in communication is gradually made lower in such a manner as to specify the upper limit values of the number of connection authorized receiving apparatuses as 14 and 4, respectively.

TABLE 1

| UPPER LIMIT OF TOTAL NUMBER OF CONNECTABLE RECEIVING APPARATUS | UPPER LIMIT TIME IN COMMUNICATION DELAY TIME |
|---|---|
| 34 | 7 milliseconds |
| 14 | 11 milliseconds |
| 4 | 15 milliseconds |

Figure 6:
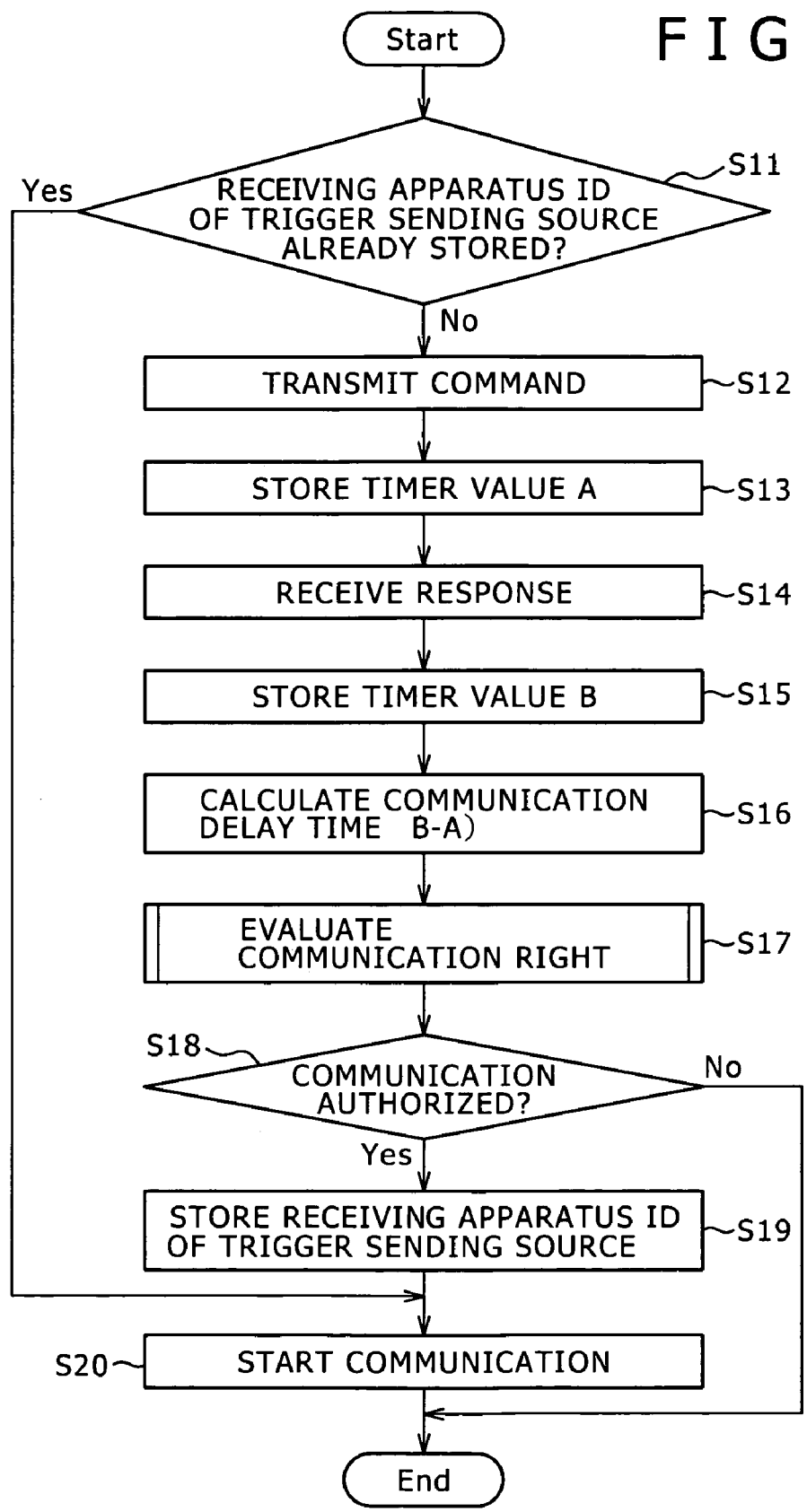
FIG. 6 is a flowchart showing the procedure of the processing for the transmitting apparatus 10 to determine the communication right to the receiving apparatus 20 in a case where setting of the number of connection authorized receiving apparatuses depending on a delay time is performed by setting a plurality of thresholds of a communication delay time.

FIG. 6 shows, in the form of a flowchart, the procedure of the processing for the transmitting apparatus 10 to determine the communication right to a newly registered receiving apparatus 20 in a case where the setting of the number of connection authorized receiving apparatuses depending on the delay time is performed by setting a plurality of thresholds of the communication delay time. It is assumed that the transmitting apparatus 10 is adapted to set the threshold of the communication delay time that defines the communication area, and also to control the communication with the receiving apparatus 20 such that the upper limit value or below of the number of connection authorized receiving apparatuses within the communication delay time is reached.

Under the above conditions, when a trigger of providing the request to newly connect the receiving apparatus 20 is generated, that is, in a case where the ID of the receiving apparatus 20 has not been registered by the transmitting apparatus 10 yet, the routine of the present processing is started (Step S11).

The transmitting apparatus 10 issues a command for measuring the communication distance (Step S12), and stores, as a variable A, the transmission time measured with the timer 14 (Step S13).

Then, when a response for measuring the communication distance is received from the receiving apparatus 20-side (Step S14), the reception time measured with the timer 14 is stored as a variable B (Step S15).

The calculation of the difference between the variables B and A enables the communication delay time between the transmitting apparatus 10 and the receiving apparatus 20 to be obtained (Step S16).

Then, the transmission apparatus 10 evaluates the communication right to the receiving apparatus 20 (Step S17). In the evaluation on the communication right, the threshold of the communication delay time, in a case of given as a short set value, is supposed to authorize a higher degree of freedom in communication, while the threshold of the communication delay time, in a case of given as a long set value, is supposed to lower the degree of freedom in communication. The procedure to evaluate the communication right is described later.

In a case where a result of the above evaluation is affirmative (Step S18), the transmitting apparatus 10 registers the ID of the receiving apparatus 20 (Step S19), and the transmitting apparatus 10 starts the communication with the receiving apparatus 20 (Step S20).

Figure 7:
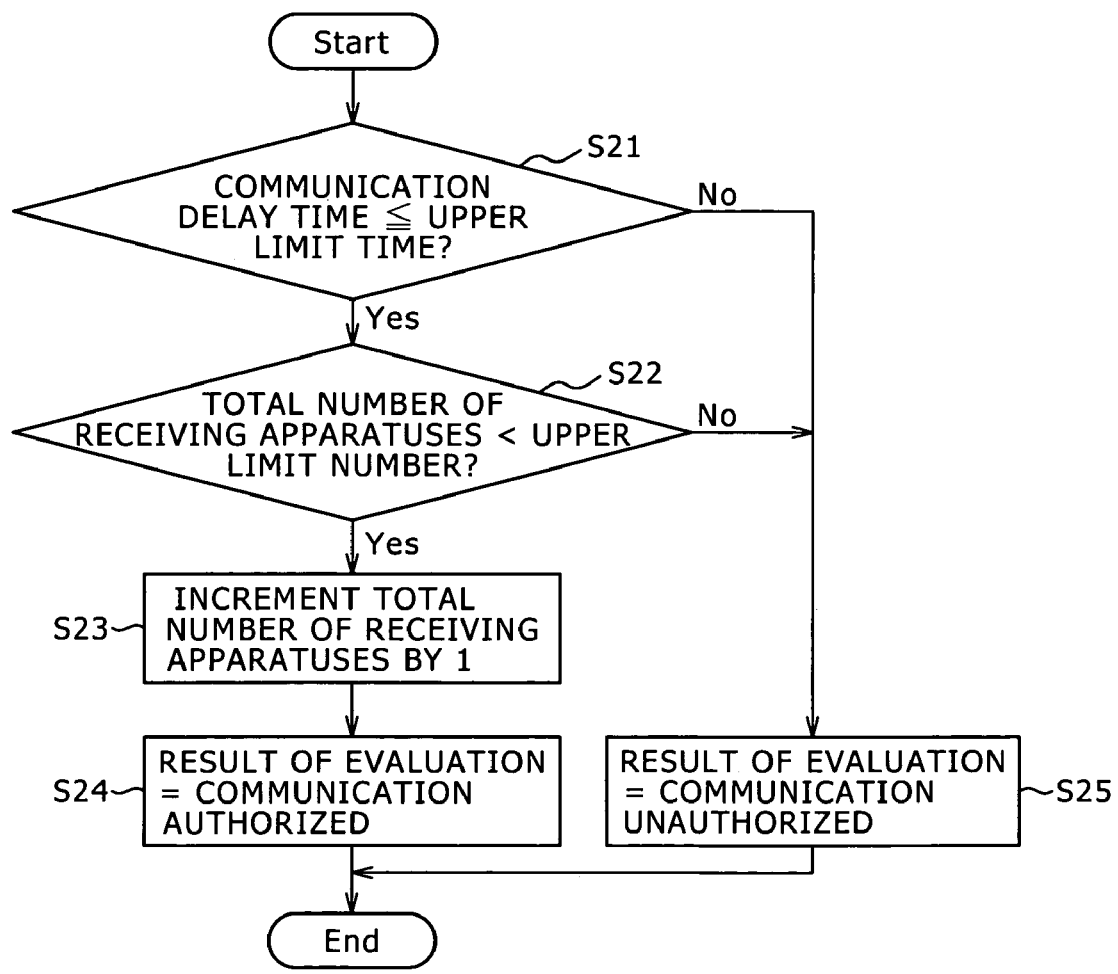
FIG. 7 is a flowchart showing one instance of the procedure of a processing to evaluate the communication right.

FIG. 7 shows, in the form of a flowchart, one instance of the procedure of the processing to evaluate the communication right in the Step S16.

Firstly, it is determined whether or not the communication delay time having been calculated in the Step S15 reaches the upper limit time or below preliminarily given in the transmitting apparatus 10 (Step S21).

In a case where a result of determination in the Step S21 is negative, a response indicating that the communication is unauthorized is sent back as the result of evaluation (Step S25), leading to a completion of the whole routine of the present processing.

Conversely, in a case where the communication delay time reaches the upper limit time or below, it is then determined whether or not the number of connection authorized receiving apparatuses given at present by the transmitting apparatus 10 is less than the upper limit value of the number of connection authorized receiving apparatuses given at the time when the relevant communication delay time reaches the upper limit time (Step S22).

In a case where the result of determination in the Step S22 is negative, a response indicating that the communication is unauthorized is sent back as the result of evaluation (Step S25), leading to the completion of the whole routine of the present processing.

In a case where the number of connection authorized receiving apparatuses given at present by the transmitting apparatus 10 is less than the upper limit value, the number of receiving apparatuses connected is incremented by 1 so as to further authorize the connection to the newly registered receiving apparatus 20 (Step S23). Then, a response indicating that the communication is authorized is sent back as the result of evaluation (Step S24), leading to the completion of the whole routine of the present processing.

Figure 8:
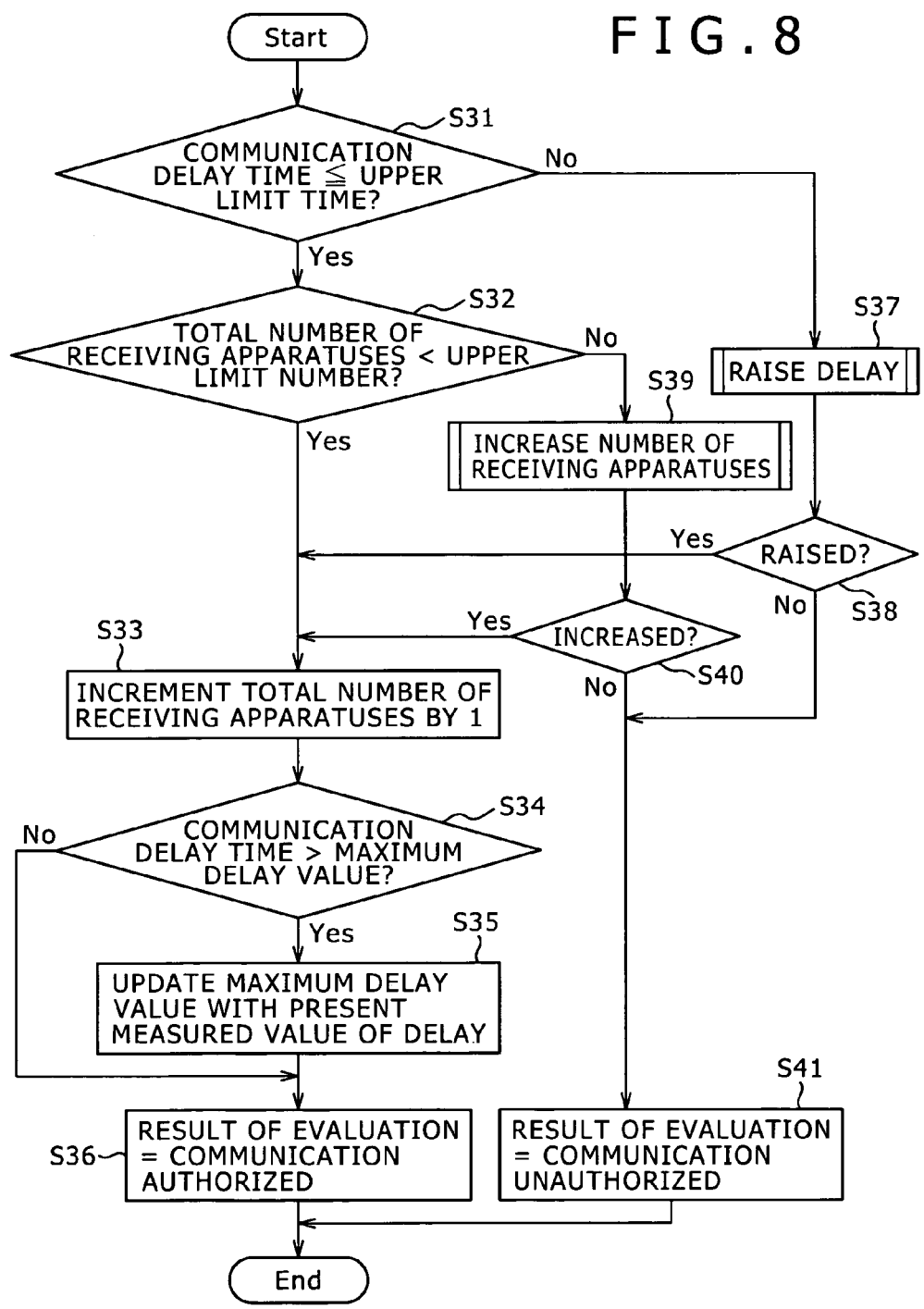
FIG. 8 is a flowchart showing another instance of the procedure of the processing to evaluate the communication right.

FIG. 8 shows, in the form of a flowchart, a different instance on the procedure of the processing to evaluate the communication right in the Step S17.

Firstly, it is determined whether or not the communication delay time having been calculated in the Step S15 reaches the upper limit time or below previously given in the transmitting apparatus 10 (Step S31).

When a result of determination in the Step S31 is negative, a processing to raise the upper limit time in the communication delay time is performed (Step S37). Then, when a raise in the upper limit time in the communication delay time is succeeded, the routine goes on to Step S33. Conversely, when the above raise is failed, a response indicating that the communication is unauthorized is sent back as the result of evaluation (Step S41), leading to the completion of the whole routine of the present processing.

Subsequently, it is determined whether or not the number of connection authorized receiving apparatuses given at present by the transmitting apparatus 10 is less than the upper limit value of the number of connection authorized receiving apparatuses given at the time when the relevant communication delay time reaches the upper limit time (Step S32).

In a case where a result of determination in the Step S32 is negative, the processing to increase the upper limit value of the number of connection authorized receiving apparatuses is performed (Step S39). Then, when an increase in the upper limit value of the number of connection authorized receiving apparatuses is succeeded, the routine goes on to Step S33. Conversely, when the above increase is failed, a response indicating that the communication is unauthorized is sent back as the result of evaluation (Step S41), leading to the completion of the whole routine of the present processing.

In a case where the number of connection authorized receiving apparatuses given at present by the transmitting apparatus 10 is less than the upper limit value, the number of receiving apparatus connected is incremented by 1 so as to further authorize the connection to the newly registered receiving apparatus 20 (Step S33).

Then, it is determined whether or not the communication delay time of the newly registered receiving apparatus 20 exceeds a maximum value of the communication delay time in the receiving apparatuses having been connected up to that time (Step S34). Then, in a case of exceeding the maximum value, a maximum delay value is given as an updated communication delay time of the receiving apparatus 20 (Step S35). Then, a response indicating that the communication is authorized is sent back as the result of evaluation (Step S36), leading to the completion of the whole routine of the present processing.

Figure 9:
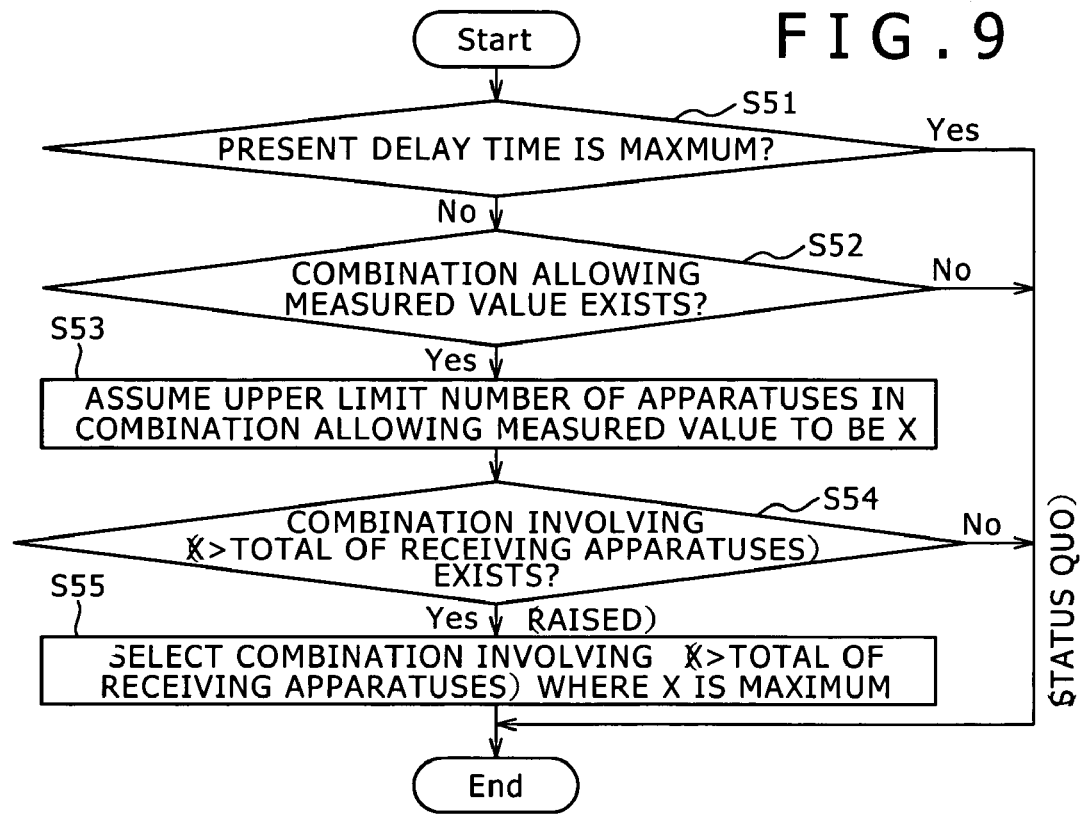
FIG. 9 is a flowchart showing the procedure of the detailed processing to increase an upper limit time in the communication delay time.

FIG. 9 shows, in the form of a flowchart, the procedure of the detailed processing to raise the upper limit time in the communication delay time in the Step S37 contained in the flowchart shown in FIG. 8.

Firstly, it is determined whether or not the communication delay time involved in the newly registered receiving apparatus 20 reaches a maximum delay time (Step S51). In a case where the maximum delay time is reached, the whole routine of the present processing is completed, while keeping the upper limit value of the communication delay time in the status quo.

In a case where the communication delay time involved in the newly registered receiving apparatus 20 does not reach the maximum delay time, it is further determined, with reference to the relation (Refer to the Table 1) with the number of connection authorized receiving apparatuses predetermined depending on the delay time, whether or not there is a combination of the upper limit time in the communication delay time allowing a present measurement result with the upper limit number of connection authorized receiving apparatuses (Step S52).

Hereupon, in a case where any appropriate combination of the upper limit time in the communication delay time with the upper limit number of receiving apparatuses does not exist, the whole routine of the present processing is completed, while keeping the upper limit value of the communication delay time in the status quo.

In a case where the appropriate combination of the upper limit time in the communication delay time with the upper limit number of receiving apparatuses exists, the upper limit number of receiving apparatuses defined by the above combination is held as a variable X (Step S53).

Then, it is further determined whether or not there is any appropriate combination of the upper limit time in the communication delay time with the upper limit number of receiving apparatuses in which the upper limit number X is larger than the present total number of receiving apparatuses (Step S54).

Hereupon, in a case where any appropriate combination does not exist, the whole routine of the present processing is completed, while keeping the upper limit value of the communication delay time in the status quo.

Conversely, in a case where the appropriate combination exists, a combination in which the upper limit number X is larger than the present total number of receiving apparatuses, where X is maximum, is selected (Step S55), leading to the completion of the whole routine of the present processing.

Figure 10:
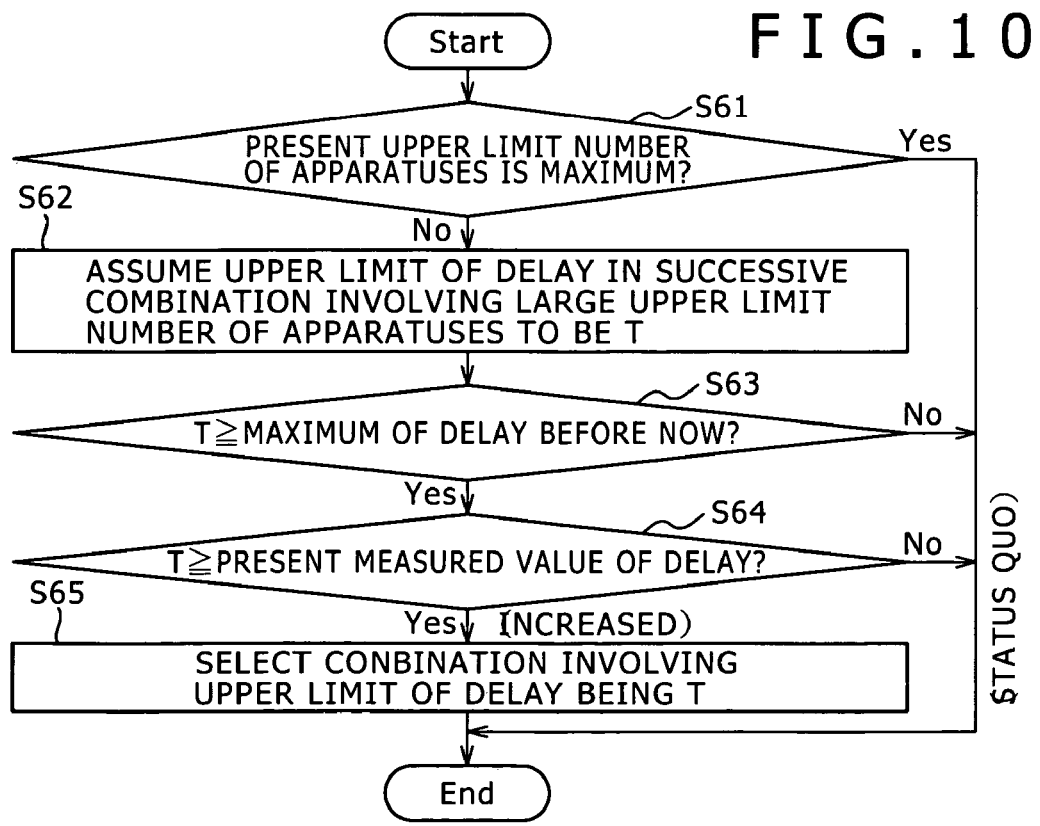
FIG. 10 is a flowchart showing the procedure of the detailed processing to increase an upper limit value of the number of connection authorized receiving apparatuses.

FIG. 10 shows, in the form of a flowchart, the procedure of the detailed processing to increase the upper limit value of the number of connection authorized receiving apparatuses in the Step S39 shown in the flowchart shown in FIG. 8.

Firstly, it is determined whether or not the present upper limit number of connection authorized receiving apparatuses is the maximum (Step S61).

Hereupon, in a case where the upper limit number of receiving apparatuses already reaches the maximum, the routine of the present processing is completed, while keeping the upper limit number of receiving apparatuses in the status quo.

Conversely, in a case where the present upper limit number of connection authorized receiving apparatuses does not reach the maximum, a nearest preceding combination of the upper limit time in the communication delay time with the upper limit number of receiving apparatuses in which the upper limit number of receiving apparatuses is larger is selected, and the upper limit time in the communication delay time in the combination is held as a variable T (Step S62).

Then, it is determined whether or not the upper limit time T in the communication delay time is equal to or more than the maximum communication delay time in the receiving apparatuses having been connected up to that time (Step S63).

Then, in a case where the upper limit time T in the communication delay time is less than the maximum communication delay time up to that time, the routine of the present processing is completed, while keeping the upper limit number of receiving apparatuses in the status quo.

Conversely, in a case where the upper limit time T in the communication delay time is equal to or more than the maximum communication delay time in the receiving apparatuses having been connected up to that time, it is further determined whether or not the upper limit time T is equal to or more than the communication delay time of the newly registered receiving apparatus 20 (Step S64).

Hereupon, in a case where the upper limit time T in the communication delay time is less than the communication delay time of the receiving apparatus 20, the routine of the present processing is completed, while keeping the upper limit number of receiving apparatuses in the status quo.

Conversely, in a case where the upper limit time T is equal to or more than the communication delay time of the newly registered receiving apparatus 20, the combination of the upper limit value in the communication delay time with the upper limit number of receiving apparatuses in which the upper limit time of the communication delay time reaches T is selected (Step S65), leading to the completion of the whole routine of the present processing.

According to the communication control method allowing the transmitting apparatus 10 to determine the communication right to the receiving apparatus 20 by setting a plurality of thresholds of the communication delay time to set the number of connection authorized receiving apparatuses depending on the delay time, as shown in FIG. 6, the raise in the degree of freedom in communication is permitted in a case where the communication delay time is short so that the high possibility exists that the communication delay time falls within the specific range. Conversely, in a case where the communication delay time is long so that the low possibility exists that the communication delay time falls in the specific range, it becomes possible to lower the degree of freedom in communication.

However, the method allowing the transmitting apparatus to control the communication right to the receiving apparatus by setting the combination of the upper limit time in a certain communication delay time with the upper limit number of connection authorized receiving apparatuses presents a problem that the restrictions on the number of communication authorized receiving apparatuses are made more exacting. That is, in a case where the new entry of the receiving apparatus involving the communication delay time exceeding the presently given upper limit time is made, the raise in the upper limit time in the communication delay time for the connection to the new receiving apparatus brings about a reduction in the upper limit number of receiving apparatuses. As a result, there may occur a situation that the receiving apparatuses already communication authorized are out of the range of the upper limit number of receiving apparatuses.

For instance, when the receiving apparatus involving the communication delay time of 14 milliseconds appears at the time when the communication with ten receiving apparatuses is authorized within the communication range where the communication delay time is equal to or less than 7 milliseconds, the reduction in the upper limit number of receiving apparatuses to four receiving apparatuses (refer to Table 1) is required for the transmitting apparatus to connect with this receiving apparatus, so that seven receiving apparatuses out of the already connected receiving apparatuses are supposed to remain in excess.

As one method of eliminating a problem in that a discontinuity of the upper limit number of receiving apparatuses occurs with switching of the upper limit time in the communication delay time as described the above, a plurality of communication delay time zones are provided, instead of the setting of a plurality of thresholds of the communication delay time, to set the number of connection authorized receiving apparatuses for each communication delay time zone.

In this case, to give the above instance, if the receiving apparatus involving the communication delay time of 14 milliseconds appears at the time when the communication with the ten receiving apparatuses is authorized within the communication area where the communication delay time is equal to or less than 7 milliseconds, the communication with the above receiving apparatus is authorized within the range of the upper limit number having been given in a different communication delay time zone, thereby eliminating the problem in that the already existing receiving apparatuses exceed the range of the upper limit number.

A table in the following shows one instance in which the setting of the number of connection authorized receiving apparatuses for each communication delay time zone is performed by setting a plurality of communication delay time zones. In this instance, the upper limit value of the number of connection authorized receiving apparatuses is specified as 20 in the communication delay time zone ranging from 0 to 7 milliseconds. Likewise, the upper limit values of the number of connection authorized receiving apparatuses are specified as 10 and 4 in the communication delay time zone ranging from 7 to 11 milliseconds and that ranging from 11 to 15 milliseconds, respectively.

TABLE 2

| UPPER LIMIT TIME IN COMMUNICATION DELAY TIME | UPPER LIMIT OF TOTAL NUMBER CONNECTABLE RECEIVING APPARATUSES |
| --- | --- |
| 0 to 7 milliseconds | 20 |
| 7 to 11 milliseconds | 10 |
| 11 to 15 milliseconds | 4 |

It is noted that, in a case of allowing the connection to the receiving apparatus in the number exceeding the upper limit in a certain delay time zone, it is possible to assign the receiving apparatuses to a longer delay time zone than the above certain delay time zone, if there is room for the upper limit number in the longer delay time zone.

Figure 11:
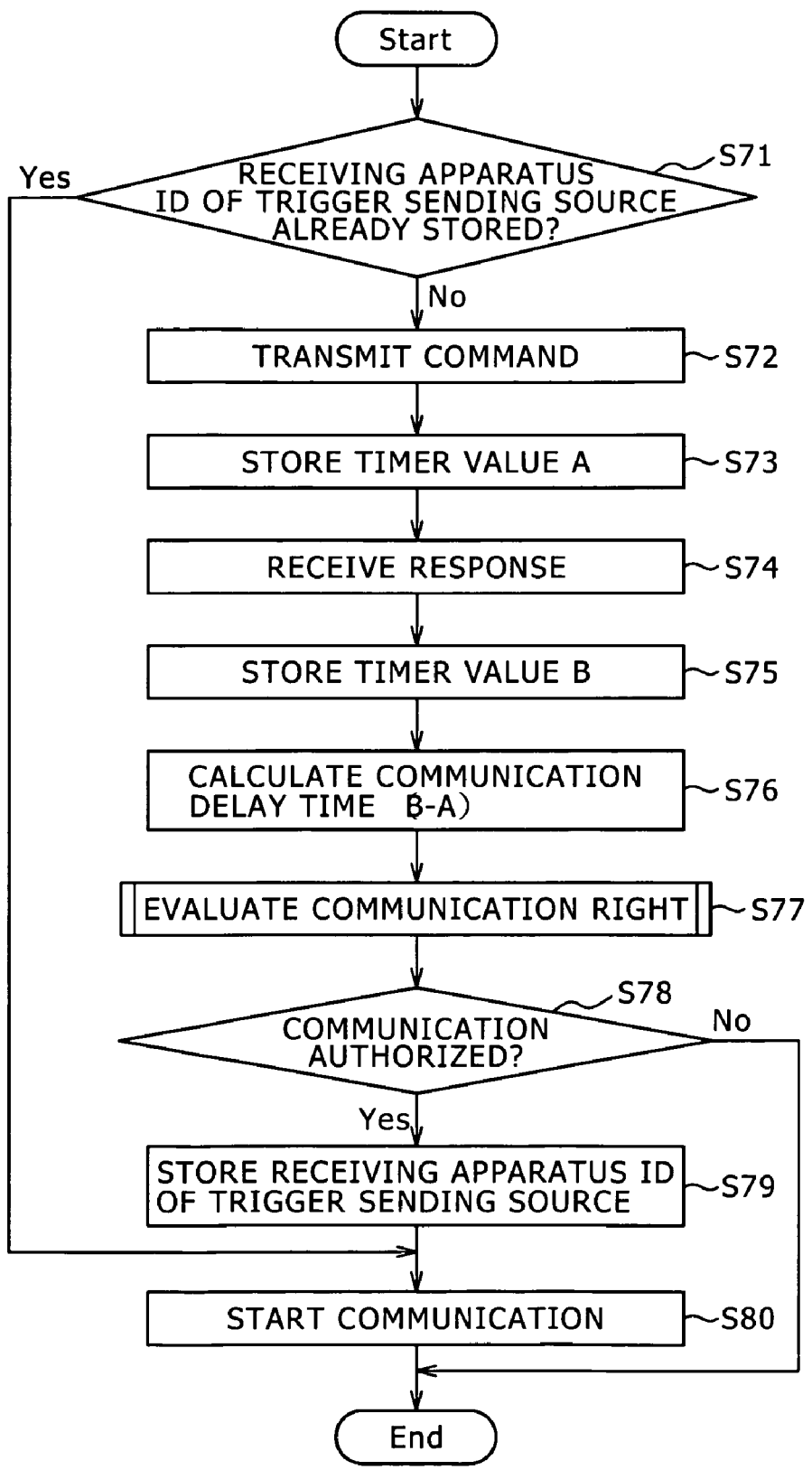
FIG. 11 is a flowchart showing the procedure of the processing for the transmitting apparatus 10 to determine the communication right to a newly registered receiving apparatus 20 in a case where setting of the number of connection authorized receiving apparatuses for each communication delay time zone is performed by setting a plurality of communication delay time zones.

FIG. 11 shows, in the form of a flowchart, the procedure of the processing for the transmitting apparatus 10 to determine the communication right to the newly registered receiving apparatus 20 in a case where the setting of the number of connection authorized receiving apparatuses for each communication delay time zone is performed by setting a plurality of communication delay time zones. It is assumed that the transmitting apparatus 10 is adapted to set the threshold of the communication delay time that defines the communication area, and also, to control the communication with the receiving apparatus such that the upper limit value or below of the number of connection authorized receiving apparatuses within the communication delay time is reached.

Under the above conditions, when a trigger of providing the request to connect the receiving apparatus 20 is generated, that is, in a case where the ID of the receiving apparatus 20 has not been registered by the transmitting apparatus 10 yet, the routine of the present processing is started (Step S71).

The transmitting apparatus 10 issues a command for measuring the communication distance (Step S72), and stores, as a variable A, the transmission time measured with the timer 14 (Step S73).

Then, when a response for measuring the communication distance from the receiving apparatus 20-side is received (Step S74), the reception time measured with the timer 14 is stored as a variable B (Step S75).

The calculation of the difference between the variables B and A enables the communication delay time between the transmitting apparatus 10 and the receiving apparatus 20 to be obtained (Step S76).

Then, the transmitting apparatus 10 evaluates the communication right to the receiving apparatus 20 (Step S77). In the evaluation of the communication right, the threshold of the communication delay time, in a case of given as the short set value, is supposed to authorize a higher degree of freedom in communication, while the threshold of the communication delay time, in a case of given as the long set value, is supposed to lower the degree of freedom in communication. The details of the procedure to evaluate the communication right are described later.

In a case where a result of the above evaluation is affirmative (Step S87), following the registration of the ID of the receiving apparatus 20 by the transmitting apparatus 10 (Step S79), the transmitting apparatus 10 starts the communication with the receiving apparatus 20 (Step S80).

Figure 12:
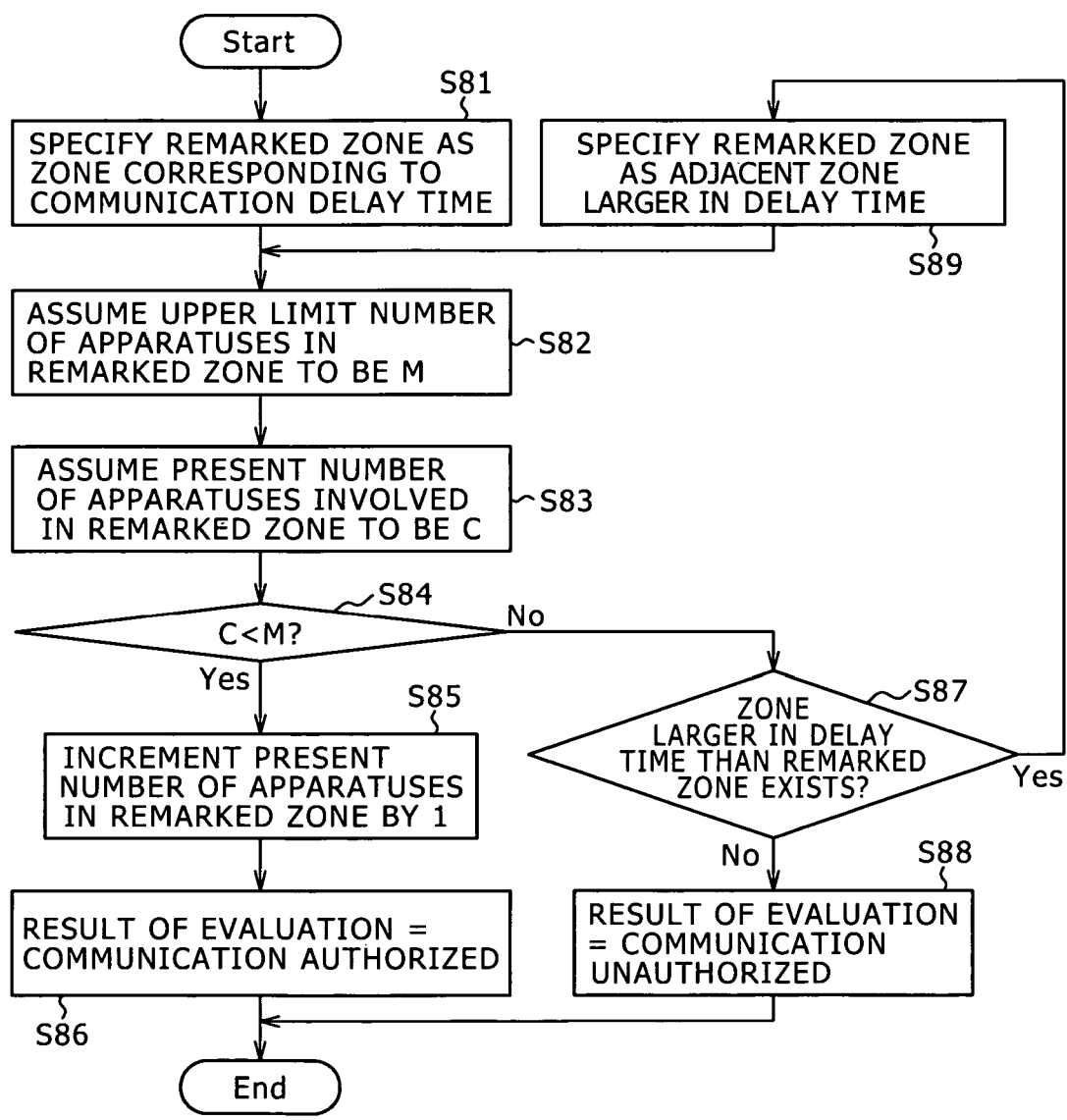
FIG. 12 is a flowchart showing one instance of the procedure of the processing to evaluate the communication right.

FIG. 12 shows, in the form of a flowchart, the procedure of the processing to evaluate the communication right in the Step S77.

Firstly, the delay time zone in which the communication delay time involved in the newly registered receiving apparatus 20 is contained is specified as a remarked delay time zone in the routine of the present processing (Step S81).

Then, the upper limit number of receiving apparatuses assigned to the remarked delay time zone is assumed to be M (Step S82), while the present number of receiving apparatuses involved in the remarked delay time zone is assumed to be C (Step S83).

Hereupon, a comparison is made, as to which having a larger value, the present number C of receiving apparatuses or the upper limit number M of receiving apparatuses (Step S84).

In a case where the upper limit number M of receiving apparatuses is larger than the present number C of receiving apparatuses, the number C is incremented by 1 in order to authorize the connection to the new receiving apparatus 20 (Step S85). Then, a response indicating that the communication is authorized is sent back as the result of evaluation (Step S86), leading to the completion of the whole routine of the present processing.

Conversely, in a case where the upper limit number M of receiving apparatuses is not larger than the present number C of receiving apparatuses, it is determined whether or not a longer delay time zone than the remarked delay time zone exists (Step S87).

In a case where the delay time zone as described above does not exist, a response indicating that the communication is unauthorized is sent back as the result of evaluation, leading to the completion of the whole routine of the present processing.

In a case where the delay time zone as described above exists, the remarked delay time zone is set again with the above longer delay time zone (Step S89), leading to a return to the Step S82 for repeating the above procedure of the processing.

INDUSTRIAL APPLICABILITY

In the foregoing, the present invention has been described in detail with reference to the specific embodiments. However, it will be obvious to those skilled in the art that modifications and changes may be made without departing from the spirit and scope of the invention. That is, it is to be understood that the present invention is disclosed as illustrative, and that all matters contained in the present specification should not be interpreted limitedly. The scope of the invention is to be determined in view of the following description of claims.

The invention claimed is:

1. An information communication system in which a transmitting apparatus transmits information to a plurality of receiving apparatuses while controlling a communication area, the system comprising:
   a communication delay time acquirer for acquiring a communication delay time for each receiving apparatus from the transmitting apparatus; and
   a connection controller for
      controlling an upper limit number of receiving apparatuses authorized to connect with the transmitting apparatus, depending on an upper limit communication delay time,
      providing a plurality of communication delay time zones to control the upper limit number of receiving apparatuses authorized to connect with the transmitting apparatus for each communication delay time zone, and
      authorizing connections to the transmitting apparatus up to the upper limit number within the upper limit communication delay time,
   wherein the upper limit communication delay time is indicative of the communication area being controlled.

2. The information communication system as claimed in claim 1, wherein the connection controller decreases the upper limit number of receiving apparatuses as the upper limit communication delay time is set longer.

3. The information communication system as claimed in claim 1, wherein the connection controller decreases the upper limit number of receiving apparatuses to give a long set value to the upper limit communication delay time.

4. The information communication system as claimed in claim 1, wherein the connection controller reduces the upper limit communication delay time to give a large set value to the upper limit number of receiving apparatuses.

5. The information communication system as claimed in claim 1, wherein the connection controller gives a large set value of the upper limit number of receiving apparatuses to the communication delay time zone of a shorter delay time.

6. The information communication system as claimed in claim 5, wherein, when the number of receiving apparatuses requesting connections in a certain communication delay time zone exceeds the upper limit number, the connection controller controls the connections by assigning the upper limit number given to the communication delay time zone of a longer delay time.

7. A transmitting apparatus for transmitting information to a plurality of receiving apparatuses while controlling a communication area, the transmitting apparatus comprising:
   a communication delay time acquirer for acquiring a communication delay time for each of the plurality of receiving apparatuses; and
   a connection controller for
      controlling an upper limit number of connection authorized receiving apparatuses, depending on an upper limit communication delay time,
      providing a plurality of communication delay time zones to control the upper limit number of connection authorized receiving apparatuses for each communication delay time zone, and
      authorizing, up to the upper limit number, connections to the receiving apparatuses, where the communication delay time is within the upper limit communication delay time,
   wherein the upper limit communication delay time is indicative of the communication area being controlled.

8. The transmitting apparatus as claimed in claim 7, wherein the connection controller decreases the upper limit number of receiving apparatuses as the upper limit communication delay time is set longer.

9. The transmitting apparatus as claimed in claim 7, wherein the connection controller decreases the upper limit number of receiving apparatuses to give a long set value to the upper limit communication delay time.

10. The transmitting apparatus as claimed in claim 7, wherein the connection controller reduces the upper limit communication delay time to give a large set value to the upper limit number of receiving apparatuses.

11. The transmitting apparatus as claimed in claim 7, wherein the connection controller gives a large set value of the upper limit number of receiving apparatuses to the communication delay time zone of a shorter communication time.

12. The transmitting apparatus as claimed in claim 11, wherein, when the number of receiving apparatuses requesting connections in a certain communication delay time zone exceeds the upper limit number, the connection controller controls the connections by assigning the upper limit number given to the communication delay time zone of a longer delay time.

13. A transmitting method for transmitting information to a plurality of receiving apparatuses while controlling a communication area, the method comprising:
- a communication delay time acquisition step of acquiring a communication delay time for each of the plurality of receiving apparatuses;
- an upper limit number controlling step for controlling an upper limit number of connection authorized receiving apparatuses, depending on an upper limit communication delay time; and
- a connection control step of:
  - providing a plurality of communication delay time zones to control the upper limit number of connection authorized receiving apparatuses for each communication delay time zone, and
  - authorizing, up to a predetermined upper limit number, connections to the receiving apparatuses, where the communication delay time is within a predetermined upper limit communication delay time,
- wherein the predetermined upper limit communication delay time is indicative of the communication area being controlled.

14. The transmitting method as claimed in claim 13, wherein, in the connection control step, the upper limit number of receiving apparatuses is decreased as the upper limit communication delay time is set longer.

15. The transmitting method as claimed in claim 13, wherein, in the connection control step, the upper limit number of receiving apparatuses is decreased to give a long set value to the upper limit communication delay time.

16. The transmitting method as claimed in claim 13, wherein, in the connection control step, the upper limit communication delay time is decreased to give a large set value to the upper limit number of receiving apparatuses.

17. The transmitting method as claimed in claim 13, wherein, in the connection control step, a large set value of the upper limit number of receiving apparatuses is given to the communication delay time zone of a shorter delay time.

18. The transmitting method as claimed in claim 17, wherein, in the connection control step, when the number of receiving apparatuses requesting connections in a certain communication delay time zone exceeds the upper limit number, the connections are controlled by assigning the upper limit number given to the communication delay time zone of a longer delay time.

19. A computer-readable non-transitory storage medium comprising programmable instructions adapted to be executed on one or more processors, and to perform a method for transmitting information to a plurality of receiving apparatuses while controlling a communication range, the method comprising:
- a communication delay time acquisition step of acquiring a communication delay time for each of the plurality of receiving apparatuses;
- an upper limit number controlling step for controlling an upper limit number of connection authorized receiving apparatuses, depending on an upper limit communication delay time; and
- a connection control step of:
  - providing a plurality of communication delay time zones to control the upper limit number of connection authorized receiving apparatuses for each communication delay time zone, and
  - authorizing, up to a predetermined upper limit number, connections to the receiving apparatuses, where the communication delay time is within a predetermined upper limit communication delay time,
- wherein the predetermined upper limit communication delay time is indicative of the communication area being controlled.

* * * * *